(12) United States Patent
Klein et al.

(10) Patent No.: US 6,868,874 B2
(45) Date of Patent: Mar. 22, 2005

(54) LOCKING FUEL TANK COVER

(75) Inventors: Arthur Lewis Klein, Cedar Falls, IA (US); Bernard Martin Gruman, Raymond, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/623,988

(22) Filed: Jul. 21, 2003

(65) Prior Publication Data
US 2005/0016621 A1 Jan. 27, 2005

(51) Int. Cl.[7] ............................................. B65B 1/04
(52) U.S. Cl. ..................... 141/98; 141/370; 220/86.2
(58) Field of Search ..................... 141/98, 312, 346, 141/369, 370, 372; 220/86.2; 70/159

(56) References Cited

U.S. PATENT DOCUMENTS

| | | | |
|---|---|---|---|
| 3,930,388 A | * | 1/1976 | Barras .......................... 70/159 |
| 4,313,321 A | | 2/1982 | Wasser .......................... 70/159 |
| 4,741,187 A | | 5/1988 | Ethell .......................... 70/158 |
| 6,755,057 B2 | * | 6/2004 | Foltz .......................... 70/159 |

OTHER PUBLICATIONS

John Deere Parts Catalog 2540; Fuel Tank And Gauge (LH)(W/Cab); pp. 1 & 2.

* cited by examiner

*Primary Examiner*—Timothy L. Maust

(57) ABSTRACT

A fuel tank cover assembly is provided for a fuel tank having a fill tube projecting therefrom and a fuel cap for covering an open end of the fill tube. The cover assembly includes a mounting member mounted on and secured to an end of the fill tube. A cover member is releasably attachable to the mounting member. The cover member can be pivoted to a locking position wherein the housing prevents access to the fuel cap and wherein it can be secured to the mounting member by a lock, such as a padlock. A funnel member is fixed to the open end of the filler tube, and the mounting member is attached to an exterior surface of the funnel.

12 Claims, 2 Drawing Sheets

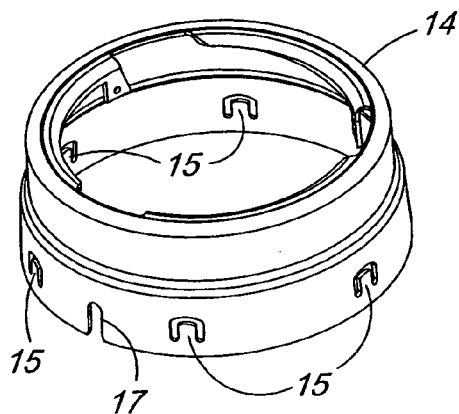
FIG. 3
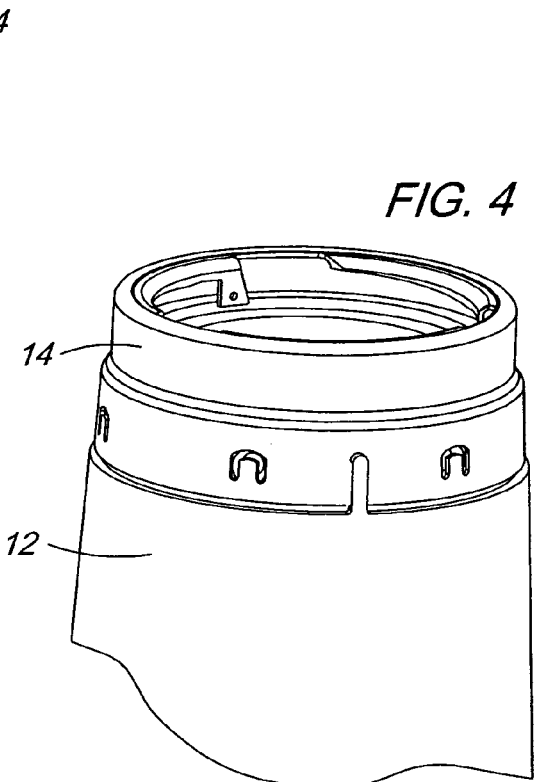
FIG. 4
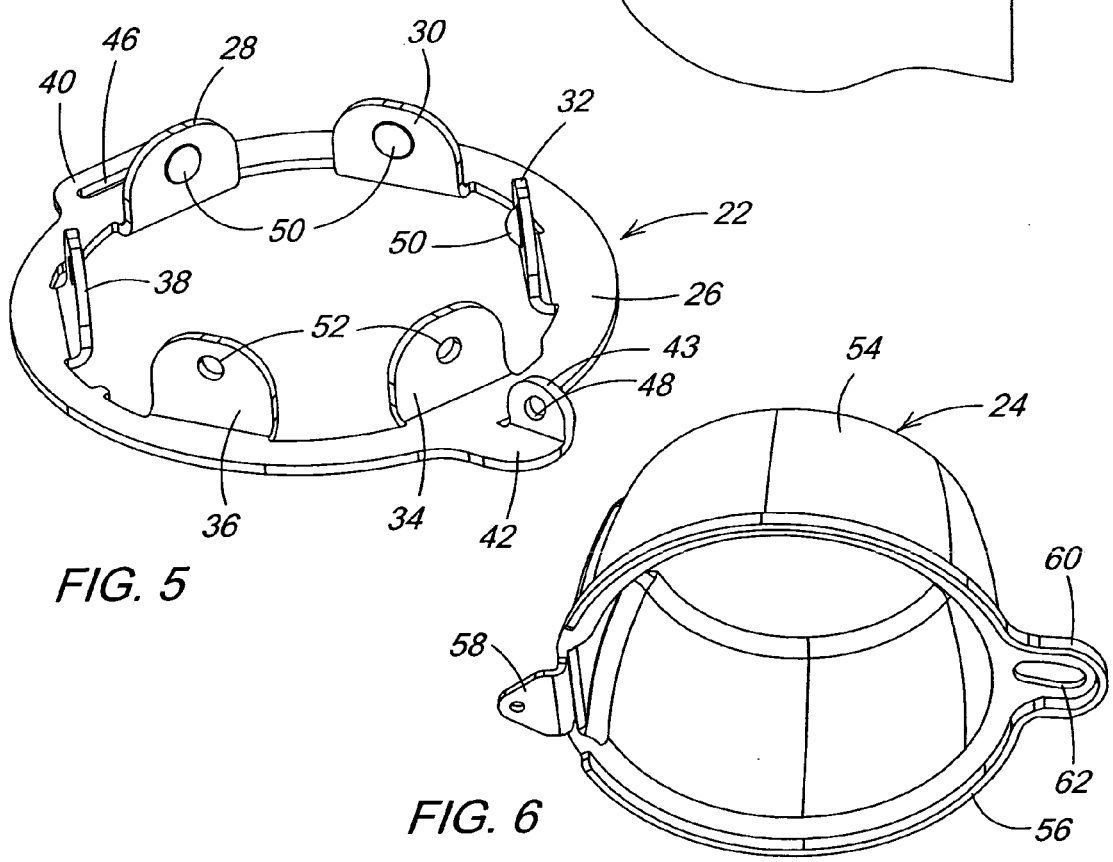
FIG. 5
FIG. 6

LOCKING FUEL TANK COVER

BACKGROUND

The present invention relates to a lockable cover for a fuel tank.

Certain plastic fuel tanks have a plastic fill tube. Metal funnels are crimped on to the end of the fill tubes for receiving lockable fuel caps. However, different fuel tanks require different funnels, and one lockable fuel cap may not work with the funnel of a different fuel tank. It is desired to have a lockable fuel tank cover which can be field installed and which can function with a variety of different fuel tanks and funnels.

A cap locking mechanism was known for use on John Deere 7000 tractors. To use this locking mechanism, the fuel cap was removed, a ring with a long lever arm was mounted over the fill neck, and the fuel cap was replaced. Then a clamping ring was mounted on the fuel cap and locked to the locking ring. The long lever arm would engage the fuel tank and prevent rotation and removal of the fuel cap. However, this previous design is prone to moving around and making noise in response to vibration of the tractor.

SUMMARY

Accordingly, an object of this invention is to provide a lockable fuel tank cover which can be field installed and which can function with a variety of different fuel tanks and funnels.

This and other objects are achieved by the present invention, wherein a fuel tank cover assembly is provided for a fuel tank having a fill tube projecting therefrom and a fuel cap for covering an open end of the fill tube. The cover assembly includes a mounting member mounted on and secured to an end of the fill tube. A cover member is releasably attachable to the mounting member. The cover member can be pivoted to a locking position wherein the housing prevents access to the fuel cap and wherein it can be secured to the mounting member by a lock, such as a padlock. A funnel member is fixed to the open end of the filler tube, and the mounting member is attached to an exterior surface of the funnel.

BRIEF DESCRIPTION OF THE DRAWINGS

FIG. 3 is a perspective view of a funnel member of the present invention;

FIG. 4 is a perspective view showing the funnel member of FIG. 3 mounted on the fill tube of FIG. 2;

FIG. 5 is a perspective view of mounting member of the present invention; and

FIG. 6 is a perspective view of the cover member of FIG. 1.

DETAILED DESCRIPTION

Figure 1:
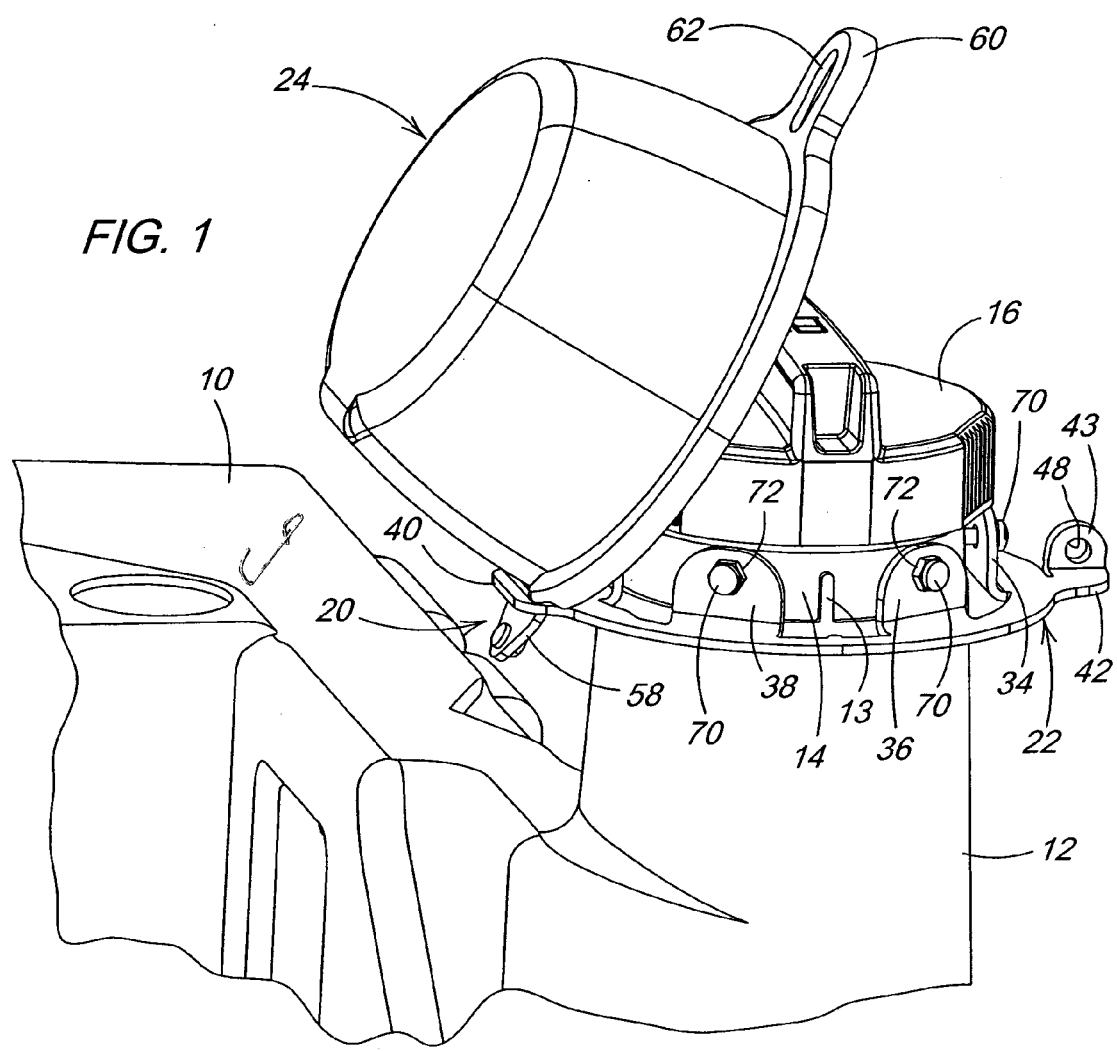
FIG. 1 is a perspective view a lockable fuel tank cover assembly according to the present invention.

Referring to FIG. 1, a fuel tank 10 has a hollow cylindrical fill tube 12 projecting therefrom. A conventional sheet metal funnel 14 is crimped onto the open end of tube 12. A conventional fuel cap 16 is screwed or cammed into the funnel 14 to cover the open end of the fill tube 12. A cover assembly 20 includes a mounting member 22 and a cover member 24. Mounting member 22 is mounted on and receives an end of the fill tube 12. Cover member 24 is releasably attachable to the mounting member 22.

Figure 2:
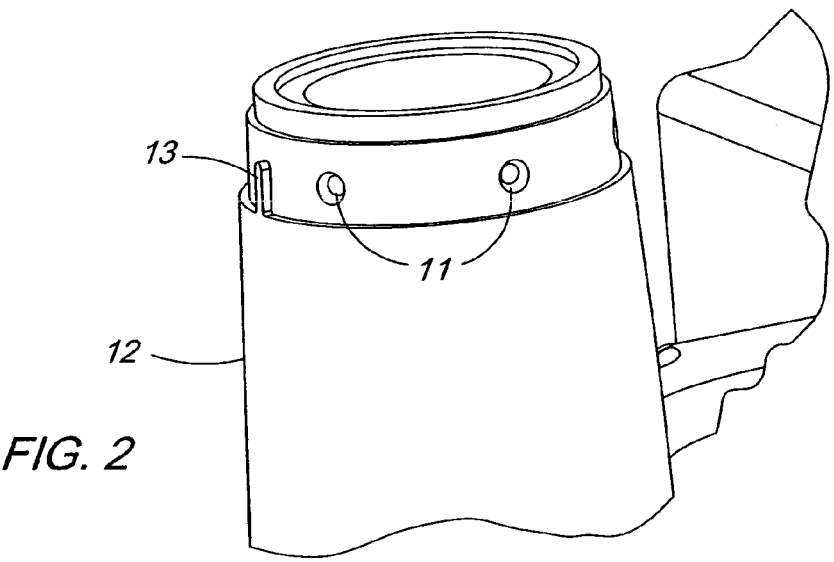
FIG. 2 is a perspective view of a fuel tank fill tube of the present invention.

Referring now to FIG. 2, the fill tube 12 has a plurality of evenly spaced apart recesses 11 formed therein and a pair of alignment ridges 13. Preferably there are 6 recesses 11, but only 2 are fully visible in FIG. 2. Referring now to FIGS. 3 and 4, funnel 14 has a plurality of spaced apart mounting fingers 15 formed therein for alignment with and resilient receipt by the recesses 11. When the fingers 15 are received by the recesses 11, they project inwardly and form recesses or indentations in the surface of the funnel 14. Funnel 14 also has a pair of grooves 17 for receiving the alignment ridges 13.

Referring now to FIG. 5, the mounting member 22 has a hollow annular ring-shaped body 26. A plurality of spaced apart tabs 28, 30, 32, 34, 36 and 38 projecting axially from a radially inner portion of the body 26. Mounting member 22 also includes a first stub 40 projecting generally radially outwardly from a side of the body 26, and a second stub 42 projecting generally radially outwardly from an opposite side of the body 26. Stub 40 has an elongated aperture or slot 46 formed therein. Stub 42 has upwardly projecting flange 43 with an opening 48 extending therethrough. Each of tabs 28, 30 and 32 has a projection 50 which projects radially inwardly. Each projection 50 is received by one of the corresponding recesses formed by the inwardly projecting fingers 15. Each of tabs 34, 36 and 38 has a threaded bore 52 projecting radially therethrough.

Referring now to FIGS. 1 and 6, cover member 24 includes a closed housing 54 and a base or rim 56. A first tab 58 projects radially outwardly from rim 56 for pivotal insertion into slot 46. A second tab 60 projects radially outwardly from rim tab 58 opposite from tab 58. An elongated slot 62 extends though tab 60. Stub 58 can be removed from slot 46 and the cover 24 can be moved away from cap 16 and mounting member 22.

As best seen in FIG. 1, mounting member 22 is held in place on the funnel 14 by screws or bolts 70 and the funnel 14 is received by the mounting member 22. Preferably, weld nuts 72 are welded to tabs 34-38 and the bolts 70 are screwed into the weld nuts 72 until they tightly engage the corresponding recesses formed by the inwardly projecting fingers 15, and thereby hold mounting member 22 in place on the funnel 14. Alternatively, spring nuts (not shown) could be used to retain the screws 70 in place. The cover member 24 may be pivoted clockwise (viewing FIG. 1) until slot 62 receives flange 43. In this position the cover 24 covers and prevents access to cap 16, and a conventional lock can be inserted through opening 48 to secure the cover 24 in this position.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A fuel tank cover assembly adapted for mounting on a fill tube projecting from a fuel tank, and adapted to cover a fuel cap for covering an open end of the fill tube, the cover assembly comprising:

a mounting member mounted on and receiving an end of the fill tube, the mounting member having a first lockable part;

a cover member releasably attachable to the mounting member, the cover member having a housing and a second lockable part, the cover member being movable to a locking position wherein the housing prevents access to the fuel cap and wherein the first and second parts can be secured together by a lock; and a funnel member is fixed to the open end of the fill tube, and the mounting member is attached to an exterior surface of the funnel member, the funnel member being received by the mounting member.

2. The fuel tank cover assembly of claim 1, wherein:

one of the funnel and mounting members has a plurality of recesses formed therein, and the other of the funnel and mounting members has a plurality of projections projecting therefrom, each of the recesses receiving a corresponding projection when the mounting member is attached to the funnel member.

3. The fuel tank cover assembly of claim 1, wherein the mounting member comprises:

a hollow annular body; and a plurality of spaced apart tabs projecting axially from a radially inner portion of the body, the tabs engaging the funnel member and coupling the body to the fill tube.

4. The fuel tank cover assembly of claim 3, wherein the mounting member comprises:

a first stub projecting generally radially outwardly from a side of the body; and a second stub projecting generally radially outwardly from an opposite side of the body, the first stub having an aperture for pivotally receiving a tab which projects from the cover member, the second stub having an opening therein for receiving a lock.

5. The fuel tank cover assembly of claim 1, wherein:

the cover member has a first tab projecting from one side thereof and the second lockable part comprising a second tab projecting from an opposite side thereof, the second tab having a slot extending therethrough; and the mounting member comprises a first stub projecting generally radially outwardly from a side of the body, a second stub projecting generally radially outwardly from an opposite side of the body and a flange projecting from the second stub, the flange having an opening therein, the first stub having an aperture for pivotally receiving the first tab, the slot being adapted to receive the flange, and the opening being adapted to receive a lock.

6. A fuel tank cover assembly adapted for mounting on a fill tube projecting from a fuel tank, and adapted to enclose a fuel cap for covering an open end of the fill tube, the cover assembly comprising:

a funnel member is fixed to the open end of the fill tube;

a mounting member attached to the funnel member near its open end, the mounting member being attached to an exterior surface of the funnel, the mounting member having first and second stubs projecting therefrom; and a cover member releasably attachable to the mounting member, the cover member having a housing and first and second tabs projecting therefrom, the first tab being pivotally coupled to the first stub, and the cover member being movable to a locking position wherein the housing prevents access to the fuel cap and wherein the second tab and the second stub can be secured together by a lock.

7. The fuel tank cover assembly of claim 6, wherein:

the second tab and the second stub having openings extending therethrough.

8. The fuel tank cover assembly of claim 6, wherein:

one of the funnel and mounting members has a plurality of recesses formed therein, and the other of the funnel and mounting members has a plurality of projections projecting therefrom, each of the recesses receiving a corresponding projection when the mounting member is attached to the funnel member.

9. The fuel tank cover assembly of claim 6, wherein the mounting member comprises:

a hollow annular body; and a plurality of spaced apart tabs projecting axially from a radially inner portion of the body, the tabs coupling the body to the fill tube.

10. A fuel tank cover assembly adapted to be mounted on a fill tube projecting from a fuel tank, and adapted to enclose a fuel cap for covering an open end of the fill tube, the cover assembly comprising:

a funnel member mounted on and receiving an end of the fill tube, the funnel member comprising a hollow annular body, and a plurality of spaced apart fingers projecting axially inwardly from a radially inner portion of the body, the fingers coupling the body to the fill tube;

the mounting member receiving and mounted on the funnel member, the mounting member having a first lockable part, the mounting member comprising a first stub projecting generally radially outwardly from a side of the body, and a second stub projecting generally radially outwardly from an opposite side of the body, the first stub having an aperture for pivotally receiving a tab which projects from the cover member, the second stub having an opening therein for receiving a lock; and a cover member releasably attachable to the mounting member, the cover member having a housing and a second lockable part, the cover member being movable to a locking position wherein the housing prevents access to the fuel cap and wherein the first and second parts can be secured together by the lock.

11. A fuel tank cover assembly adapted to be mounted on a fill tube projecting from a fuel tank, and adapted to enclose a fuel cap for covering an open end of the fill tube, the cover assembly comprising:

a mounting member mounted on and receiving an end of the fill tube, the mounting member having a first lockable part; and a cover member releasably attachable to the mounting member, the cover member having a housing and a second lockable part, the cover member being movable to a locking position wherein the housing prevents access to the fuel cap and wherein the first and second parts can be secured together by a lock;

the cover member having a first tab projecting from one side thereof and the second lockable part comprising a second tab projecting from an opposite side thereof, the second tab having a slot extending therethrough; and the mounting member comprising a first stub projecting generally radially outwardly from a side of the body, a second stub projecting generally radially outwardly from an opposite side of the body and a flange projecting from the second stub, the flange having an opening therein, the first stub having an aperture for pivotally receiving the first tab, the slot being adapted to receive the flange, and the opening being adapted to receive a lock.

12. A fuel tank cover assembly adapted to be mounted on a fill tube projecting from a fuel tank, and adapted to enclose a fuel cap for covering an open end of the fill tube, the cover assembly comprising:

a mounting member attached to the fill tube near its open end, the mounting member having first and second stubs projecting therefrom, the mounting member comprising a hollow annular body, and a plurality of spaced apart arms projecting axially from a radially inner portion of the body, the arms coupling the body to the fill tube; and a cover member releasably attachable to the mounting member, the cover member having a housing and first and second tabs projecting therefrom, the first tab being pivotally coupled to the first stub, and the cover member being movable to a locking position wherein the housing prevents access to the fuel cap and wherein the second tab and the second stub can be secured together by a lock, the first and second stubs project generally radially outwardly from opposite sides of the body of the mounting member, the first stub having an aperture for pivotally receiving the first tab of the cover member, the second stub having an opening therein for receiving a lock.

* * * * *